(12) United States Patent
Mullenaux

(10) Patent No.: US 11,371,224 B2
(45) Date of Patent: Jun. 28, 2022

(54) WATER-DISPENSING METHOD FOR FURNITURE

(71) Applicant: AQUAPHANT, INC., Las Vegas, NV (US)

(72) Inventor: Thomas Mullenaux, San Pedro, CA (US)

(*) Notice: Subject to any disclaimer, the term of this patent is extended or adjusted under 35 U.S.C. 154(b) by 0 days.

(21) Appl. No.: 17/116,395

(22) Filed: Dec. 9, 2020

(65) Prior Publication Data
US 2021/0301506 A1    Sep. 30, 2021

Related U.S. Application Data

(63) Continuation-in-part of application No. 16/827,794, filed on Mar. 24, 2020, now Pat. No. 11,066,286.

(51) Int. Cl.
| | |
|---|---|
| *E03B 3/28* | (2006.01) |
| *B67D 1/00* | (2006.01) |
| *C02F 1/28* | (2006.01) |
| *C02F 1/00* | (2006.01) |

(52) U.S. Cl.
CPC .............. *E03B 3/28* (2013.01); *B67D 1/0004* (2013.01); *C02F 1/003* (2013.01); *C02F 1/283* (2013.01); *B67D 2210/0001* (2013.01); *B67D 2210/00031* (2013.01); *C02F 2303/04* (2013.01); *C02F 2307/10* (2013.01)

(58) Field of Classification Search
CPC ......... E03B 3/28; B67D 1/0004; C02F 1/003; C02F 1/283
USPC .......................................... 222/192; 137/374
See application file for complete search history.

(56) References Cited

U.S. PATENT DOCUMENTS

| | | | | |
|---|---|---|---|---|
| 3,120,404 A | * | 2/1964 | Bramming ................ | A45F 3/46 297/118 |
| 3,560,047 A | * | 2/1971 | Davis ..................... | A47C 7/626 297/188.08 |
| 3,745,596 A | * | 7/1973 | Copeland ............... | A47C 17/86 5/308 |
| 4,196,081 A | * | 4/1980 | Pavia ...................... | C02F 1/28 210/94 |
| 4,420,097 A | * | 12/1983 | Motsenbocker ......... | A45F 3/16 222/131 |
| 4,533,050 A | * | 8/1985 | Bake, Jr. ................. | A45C 9/00 206/217 |

(Continued)

*Primary Examiner* — Paul R Durand
*Assistant Examiner* — Michael J. Melaragno
(74) *Attorney, Agent, or Firm* — Kyle A. Fletcher, Esq.

(57) ABSTRACT

The water-dispensing method for furniture incorporates a water recovery process, a water STT process, and a discharge process. The water recovery process: a) converts water contained in a gas phase in the atmosphere into water in a liquid phase; b) initially treats the converted liquid phase water to remove microorganisms and other chemical contaminations; and c) transports the initially treated liquid phase water to the water STT process. The water STT process: a) receives and stores the initially treated (liquid phase) water from the water recovery process; b) subsequently treats the stored water with a final treatment to remove microorganisms and other chemical contaminations; and, c) transports the treated stored water to the discharge process. The discharge process: a) receives the water from the water STT process after the final treatment; and, b) controls the discharge of the water received from the water STT process.

19 Claims, 5 Drawing Sheets

(56) References Cited

U.S. PATENT DOCUMENTS

| | | | | |
|---|---|---|---|---|
| D293,393 S * | 12/1987 | Bothun | | D6/335 |
| 4,757,921 A * | 7/1988 | Snowball | | C02F 9/005 |
| | | | | 222/146.6 |
| 4,871,069 A * | 10/1989 | Guimont | | A45C 9/00 |
| | | | | 206/545 |
| 5,046,529 A * | 9/1991 | Corella | | E03B 11/06 |
| | | | | 137/590.5 |
| 5,090,075 A * | 2/1992 | Larson | | A47C 27/085 |
| | | | | 141/114 |
| 5,106,512 A * | 4/1992 | Reidy | | B01D 5/0039 |
| | | | | 210/744 |
| 5,146,633 A * | 9/1992 | Kim | | A47C 21/048 |
| | | | | 5/284 |
| 5,149,446 A * | 9/1992 | Reidy | | B01D 5/0039 |
| | | | | 210/744 |
| 5,203,989 A * | 4/1993 | Reidy | | E03B 3/28 |
| | | | | 210/137 |
| 5,248,417 A * | 9/1993 | Reid | | B01D 24/007 |
| | | | | 210/195.1 |
| D342,393 S * | 12/1993 | Cephas | | D6/384 |
| 5,271,837 A * | 12/1993 | Discepolo | | B01J 39/04 |
| | | | | 210/282 |
| 5,553,459 A * | 9/1996 | Harrison | | E03B 3/28 |
| | | | | 62/93 |
| 5,722,596 A * | 3/1998 | Dome | | A47C 1/14 |
| | | | | 239/289 |
| 5,772,075 A * | 6/1998 | Ash, Jr. | | B67D 1/04 |
| | | | | 222/1 |
| 5,992,684 A * | 11/1999 | Russell | | B67D 1/006 |
| | | | | 222/1 |
| 6,058,718 A * | 5/2000 | Forsberg | | C02F 1/008 |
| | | | | 62/125 |
| 6,230,513 B1 * | 5/2001 | Reinmuth | | B67D 1/0857 |
| | | | | 222/146.6 |
| 6,237,352 B1 * | 5/2001 | Goodchild | | F25B 47/006 |
| | | | | 62/196.4 |
| 6,253,394 B1 * | 7/2001 | Goyette | | A47K 1/02 |
| | | | | 4/626 |
| 6,354,342 B1 * | 3/2002 | Gagliano | | B67D 1/0006 |
| | | | | 141/82 |
| 6,378,546 B1 * | 4/2002 | Hansen | | E03B 11/06 |
| | | | | 137/208 |
| 6,423,212 B1 * | 7/2002 | Bosko | | B01D 61/12 |
| | | | | 210/108 |
| 6,513,343 B2 * | 2/2003 | Pahl | | A47J 41/0061 |
| | | | | 62/371 |
| 6,588,225 B1 * | 7/2003 | Hodgson | | F25B 47/022 |
| | | | | 62/285 |
| 6,588,226 B1 * | 7/2003 | Semrow | | C02F 9/005 |
| | | | | 62/291 |
| 6,915,924 B1 * | 7/2005 | Noiseux | | E03B 7/07 |
| | | | | 222/64 |
| 6,945,063 B2 * | 9/2005 | Max | | B01D 5/0042 |
| | | | | 62/235.1 |
| 6,966,464 B2 * | 11/2005 | Betkowski | | A47C 1/16 |
| | | | | 222/192 |
| 8,123,290 B1 * | 2/2012 | Aiken | | A47C 7/744 |
| | | | | 297/180.1 |
| 8,297,695 B1 * | 10/2012 | Aiken | | A47C 7/744 |
| | | | | 297/180.1 |
| 8,302,412 B2 * | 11/2012 | Tieleman | | C02F 3/1263 |
| | | | | 62/150 |
| 8,650,892 B2 * | 2/2014 | Ferreira | | C02F 3/1221 |
| | | | | 62/150 |
| 8,763,655 B2 * | 7/2014 | Springer | | B67D 1/06 |
| | | | | 141/113 |
| 8,777,182 B2 * | 7/2014 | Springer | | F16K 31/10 |
| | | | | 251/129.2 |
| 9,016,333 B2 * | 4/2015 | Shaffer | | B65D 1/04 |
| | | | | 141/113 |
| 9,284,174 B2 * | 3/2016 | Springer | | B67D 1/0894 |
| 9,440,835 B2 * | 9/2016 | Springer | | B67D 1/0888 |
| 9,561,451 B2 * | 2/2017 | Dorfman | | E03B 3/28 |
| 10,161,564 B1 * | 12/2018 | Delobel | | A47C 7/62 |
| 10,207,910 B2 * | 2/2019 | Springer | | B67D 1/1236 |
| 10,219,631 B1 * | 3/2019 | Jimenez | | A47C 7/622 |
| 10,266,437 B2 * | 4/2019 | Yoon | | B01F 5/0471 |
| 10,405,670 B1 * | 9/2019 | Mullenaux | | B67D 1/0004 |
| 10,421,670 B1 * | 9/2019 | Wilkie | | A23L 2/42 |
| 10,513,213 B1 * | 12/2019 | Mullenaux | | B67D 1/0869 |
| 10,525,373 B2 * | 1/2020 | Dorfman | | B01D 5/0051 |
| 10,612,215 B2 * | 4/2020 | Holbrook | | E03B 11/02 |
| 10,626,581 B1 * | 4/2020 | Mullenaux | | A47C 7/72 |
| 10,696,530 B2 * | 6/2020 | Springer | | B67D 1/0888 |
| 10,759,644 B2 * | 9/2020 | Lim | | B67D 1/06 |
| 10,994,978 B1 * | 5/2021 | Mullenaux | | B60N 3/18 |
| 11,066,286 B1 * | 7/2021 | Mullenaux | | A47C 7/72 |
| 2002/0029580 A1 * | 3/2002 | Faqih | | F24F 13/222 |
| | | | | 62/291 |
| 2002/0046569 A1 * | 4/2002 | Faqih | | C02F 9/005 |
| | | | | 62/188 |
| 2004/0000165 A1 * | 1/2004 | Max | | B01D 5/0042 |
| | | | | 62/615 |
| 2004/0049845 A1 * | 3/2004 | Gallant | | E04B 2/745 |
| | | | | 4/664 |
| 2004/0164093 A1 * | 8/2004 | Redman | | A47K 5/1205 |
| | | | | 222/95 |
| 2005/0067434 A1 * | 3/2005 | Yu | | B67D 3/0032 |
| | | | | 222/185.1 |
| 2005/0139552 A1 * | 6/2005 | Forsberg | | E03B 3/28 |
| | | | | 62/635 |
| 2005/0284167 A1 * | 12/2005 | Morgan | | B01D 5/009 |
| | | | | 62/272 |
| 2006/0059922 A1 * | 3/2006 | Anderson | | B01D 5/0039 |
| | | | | 62/93 |
| 2006/0112711 A1 * | 6/2006 | Yoon | | B01D 5/0072 |
| | | | | 62/285 |
| 2006/0288709 A1 * | 12/2006 | Reidy | | F25B 21/02 |
| | | | | 62/3.4 |
| 2007/0062972 A1 * | 3/2007 | Feldman | | B67D 1/0045 |
| | | | | 222/129.1 |
| 2008/0022694 A1 * | 1/2008 | Anderson | | B01D 5/009 |
| | | | | 62/3.4 |
| 2008/0223478 A1 * | 9/2008 | Hantsoo | | B67D 1/0894 |
| | | | | 141/2 |
| 2008/0308176 A1 * | 12/2008 | Weems | | B67D 1/07 |
| | | | | 141/11 |
| 2009/0077992 A1 * | 3/2009 | Anderson | | B01D 5/009 |
| | | | | 62/291 |
| 2009/0114091 A1 * | 5/2009 | Blum | | B03C 3/32 |
| | | | | 95/72 |
| 2010/0025311 A1 * | 2/2010 | Jones | | C02F 1/048 |
| | | | | 210/149 |
| 2011/0121020 A1 * | 5/2011 | Springer | | B67D 1/0888 |
| | | | | 222/1 |
| 2012/0103926 A1 * | 5/2012 | Ibsies | | B65D 1/06 |
| | | | | 215/228 |
| 2012/0111889 A1 * | 5/2012 | Huff | | A01G 25/09 |
| | | | | 222/143 |
| 2012/0267298 A1 * | 10/2012 | Hansen | | C02F 1/4674 |
| | | | | 210/198.1 |
| 2012/0325343 A1 * | 12/2012 | Mayer | | C02F 9/00 |
| | | | | 137/544 |
| 2013/0118639 A1 * | 5/2013 | Springer | | B65D 1/06 |
| | | | | 141/2 |
| 2013/0213865 A1 * | 8/2013 | Hsu | | C02F 1/18 |
| | | | | 210/85 |
| 2013/0220906 A1 * | 8/2013 | Stenhouse | | E03B 3/28 |
| | | | | 210/181 |
| 2013/0227879 A1 * | 9/2013 | Lehky | | B01D 53/263 |
| | | | | 47/58.1 R |
| 2014/0182744 A1 * | 7/2014 | Shaffer | | B67D 1/06 |
| | | | | 141/362 |
| 2014/0209634 A1 * | 7/2014 | Metropulos | | B67D 1/06 |
| | | | | 222/129.1 |
| 2014/0239014 A1 * | 8/2014 | Gallaher | | A45F 3/16 |
| | | | | 222/173 |

(56) References Cited

U.S. PATENT DOCUMENTS

| | | | | |
|---|---|---|---|---|
| 2014/0332113 | A1* | 11/2014 | Springer | A47G 19/2205 141/1 |
| 2014/0345721 | A1* | 11/2014 | Keisel | E03B 5/02 137/565.17 |
| 2015/0096937 | A1* | 4/2015 | Munro | C02F 1/441 210/652 |
| 2015/0097001 | A1* | 4/2015 | Gatipon | B67D 1/0857 222/108 |
| 2015/0107281 | A1* | 4/2015 | West | F25D 21/14 62/93 |
| 2016/0029823 | A1* | 2/2016 | Tuggle | B67D 1/0004 222/146.6 |
| 2016/0031694 | A1* | 2/2016 | Orita | B67D 1/07 222/638 |
| 2016/0060850 | A1* | 3/2016 | Johnson | E03B 11/06 137/12 |
| 2016/0167990 | A1* | 6/2016 | Lee | C02F 1/686 137/268 |
| 2016/0229715 | A1* | 8/2016 | Kim | C02F 9/005 |
| 2016/0229716 | A1* | 8/2016 | Lee | C02F 1/4672 |
| 2016/0231029 | A1* | 8/2016 | Pan | A47B 79/00 |
| 2016/0340165 | A1* | 11/2016 | Lim | B67D 1/0021 |
| 2016/0376141 | A1* | 12/2016 | Springer | B67D 1/124 141/1 |
| 2017/0001853 | A1* | 1/2017 | Park | B65D 85/72 |
| 2018/0263394 | A1* | 9/2018 | Thomas | A47C 7/664 |
| 2018/0332972 | A1* | 11/2018 | Jaeckel | A47C 7/70 |
| 2018/0368599 | A1* | 12/2018 | Delobel | A47C 7/622 |
| 2018/0369713 | A1* | 12/2018 | Dorfman | B01D 5/0006 |
| 2018/0370784 | A1* | 12/2018 | Bolender | B67D 1/0082 |
| 2019/0010681 | A1* | 1/2019 | Shi | E03B 7/04 |
| 2019/0031546 | A1* | 1/2019 | Hollingsworth | C02F 9/00 |
| 2019/0127253 | A1* | 5/2019 | Thomas | C02F 9/00 |
| 2019/0153704 | A1* | 5/2019 | Gido | B01D 53/265 |
| 2019/0154350 | A1* | 5/2019 | Dulberg | F28F 3/08 |
| 2019/0177149 | A1* | 6/2019 | Springer | B67D 1/124 |
| 2019/0249400 | A1* | 8/2019 | Holbrook | E03B 11/02 |
| 2019/0321784 | A1* | 10/2019 | Dunham | B01D 61/06 |
| 2019/0329147 | A1* | 10/2019 | Enzenhofer | B01B 1/005 |
| 2020/0048875 | A1* | 2/2020 | Subramanian | E03B 3/28 |
| 2020/0055721 | A1* | 2/2020 | Bissen | C02F 9/005 |
| 2020/0055761 | A1* | 2/2020 | Bissen | A47J 31/468 |
| 2020/0122994 | A1* | 4/2020 | Cimatti et al. | B67D 1/0888 |
| 2020/0216331 | A1* | 7/2020 | Jeon | B67D 1/0014 |
| 2020/0239347 | A1* | 7/2020 | Hollingsworth | E03B 3/28 |
| 2020/0298174 | A1* | 9/2020 | Boudreault | B01D 53/26 |
| 2021/0009453 | A1* | 1/2021 | Boyle | C02F 1/008 |
| 2021/0016199 | A1* | 1/2021 | Abolsky | C02F 1/685 |
| 2021/0039942 | A1* | 2/2021 | Springer | G06K 7/10297 |
| 2021/0047165 | A1* | 2/2021 | Showalter | B67D 1/0004 |
| 2021/0171364 | A1* | 6/2021 | Vogelsang | B01D 3/42 |

* cited by examiner

WATER-DISPENSING METHOD FOR FURNITURE

CROSS REFERENCES TO RELATED APPLICATIONS

This non-provisional application is a continuation-in-part application filed under 37 CFR 1.53(b) that claims the benefit of United States 35 USC 120 from non-provisional application U.S. Ser. No. 16/827,794 filed on Mar. 24, 2020 by the inventor: Thomas Mullenaux of San Pedro, Calif. The non-provisional application U.S. Ser. No. 16/827,794 is itself a continuation-in-part application filed under 37 CFR 1.53(b) that claimed the benefit of United States 35 USC 120 from non-provisional application U.S. Ser. No. 16/519,213 filed on Jul. 23, 2019 by the inventor: Thomas Mullenaux of San Pedro, Calif. The non-provisional application U.S. Ser. No. 16/519,213 is itself a continuation-in-part application filed under 37 CFR 1.53(b) that claimed the benefit of United States 35 USC 120 from non-provisional application U.S. Ser. No. 16/140,643 filed on Sep. 25, 2018 by the inventor: Thomas Mullenaux of San Pedro, Calif.

This non-provisional application further claims the benefit of United States 35 USC 120 from non-provisional application U.S. Ser. No. 17/063,771 filed on Oct. 6, 2020 by the inventor: Thomas Mullenaux of San Pedro, Calif.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of chemistry and the treatment of water, more specifically, a water treatment method configured for use with a domestic article. (C02F2307/12)

SUMMARY OF INVENTION

The water-dispensing method for furniture is a process. The water-dispensing method for furniture comprises a water recovery process, a water storage treatment and a transport process (referred to as the water STT process), and a discharge process. The water recovery process: a) converts water contained in a gas phase in the atmosphere into water in a liquid phase; b) initially treats the converted liquid phase water to remove microorganisms and other chemical contaminations; and c) transports the initially treated liquid phase water to the water STT process. The water STT process: a) receives and stores the initially treated (liquid phase) water from the water recovery process; b) subsequently treats the stored water with a final treatment to remove microorganisms and other chemical contaminations; and, c) transports the treated stored water to the discharge process. The discharge process: a) receives the water from the water STT process after the final treatment; and, b) controls the discharge of the water received from the water STT process.

The water-dispensing method for furniture is incorporated as an accessory to a domestic article. The domestic article is a rigid structure. The domestic article contains the water recovery process, the water STT process, and the discharge process. The domestic article is formed with all apertures and form factors necessary to allow the domestic article to accommodate the use and operation of the water-dispensing method for furniture.

These together with additional objects, features and advantages of the water-dispensing method for furniture will be readily apparent to those of ordinary skill in the art upon reading the following detailed description of the presently preferred, but nonetheless illustrative, embodiments when taken in conjunction with the accompanying drawings.

In this respect, before explaining the current embodiments of the water-dispensing method for furniture in detail, it is to be understood that the water-dispensing method for furniture is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the water-dispensing method for furniture.

It is therefore important that the claims be regarded as including such equivalent construction insofar as they do not depart from the spirit and scope of the water-dispensing method for furniture. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
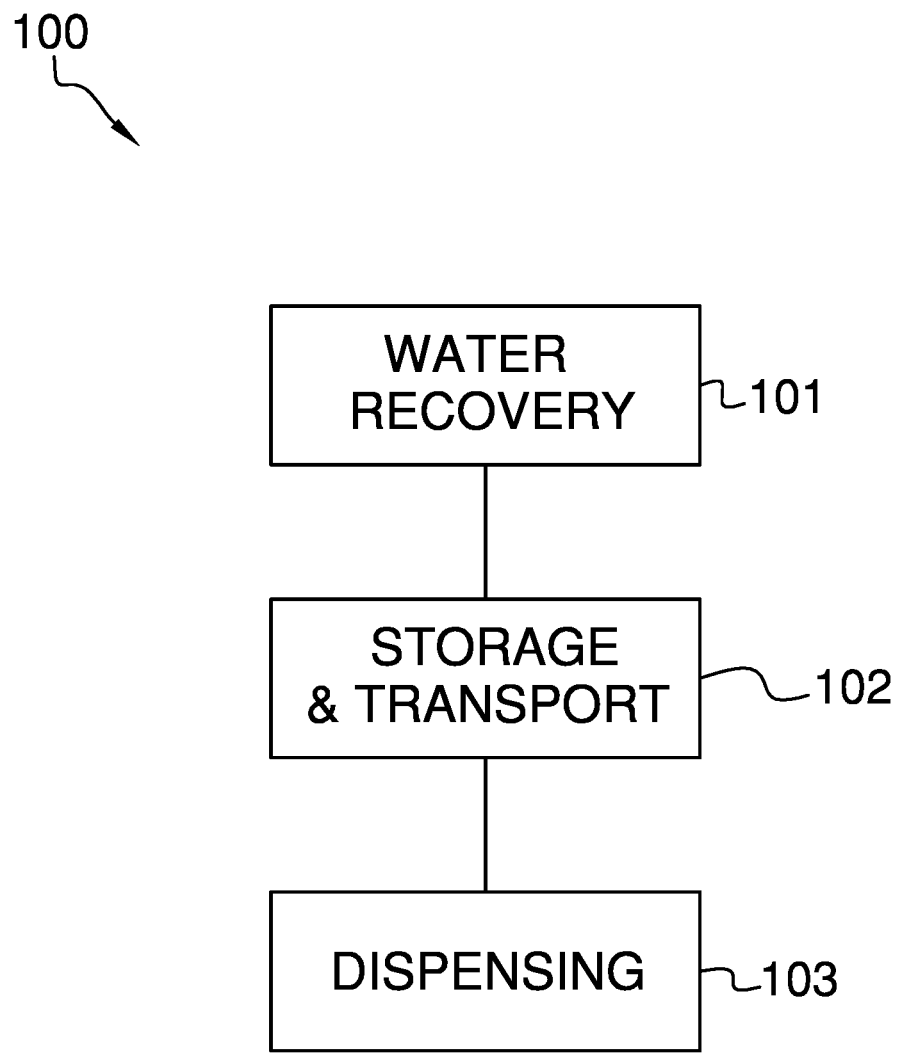
FIG. 1 is a block diagram of an embodiment of the disclosure.
Figure 2:
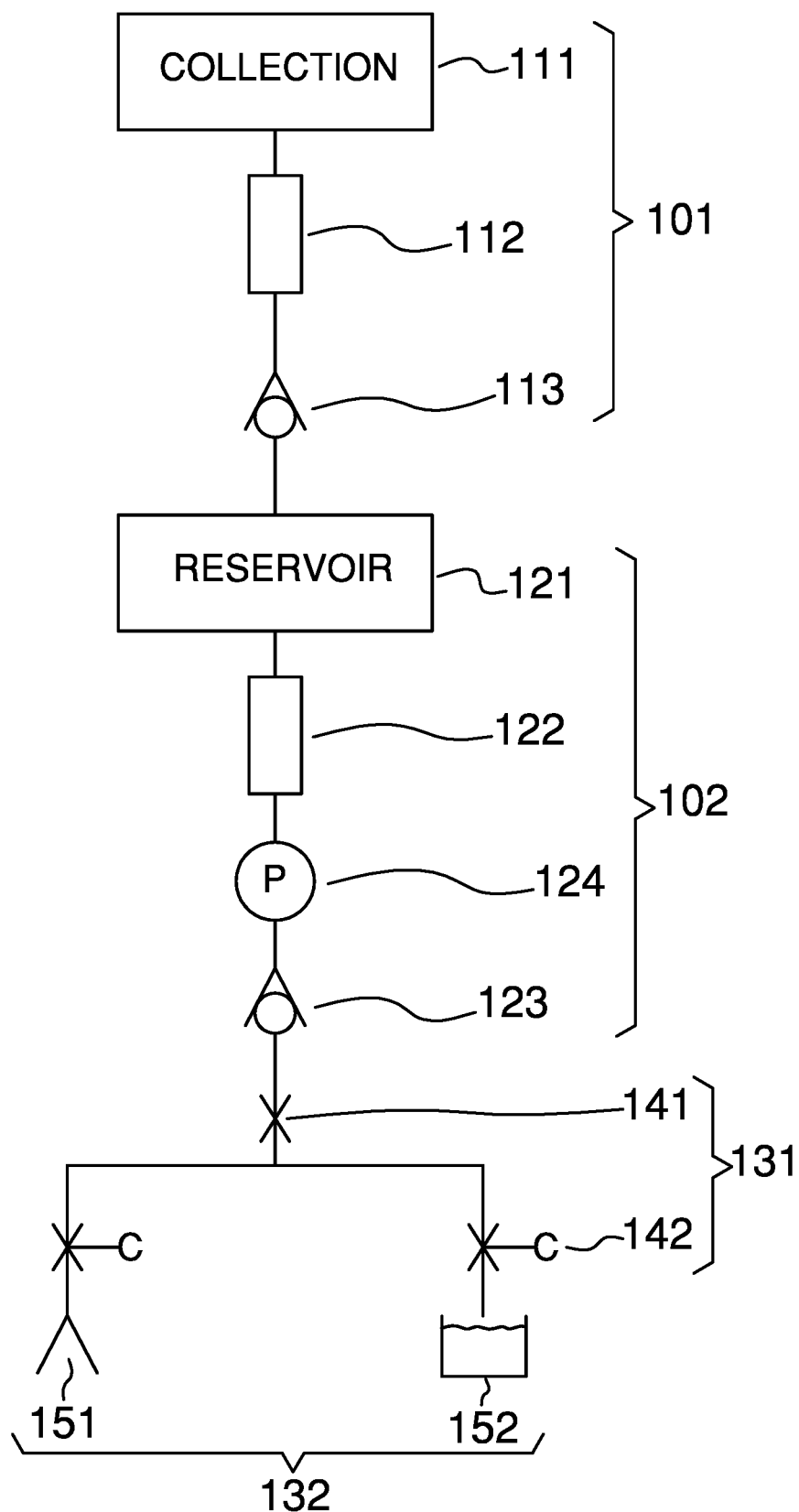
FIG. 2 is a block diagram of an embodiment of the disclosure.
Figure 3:
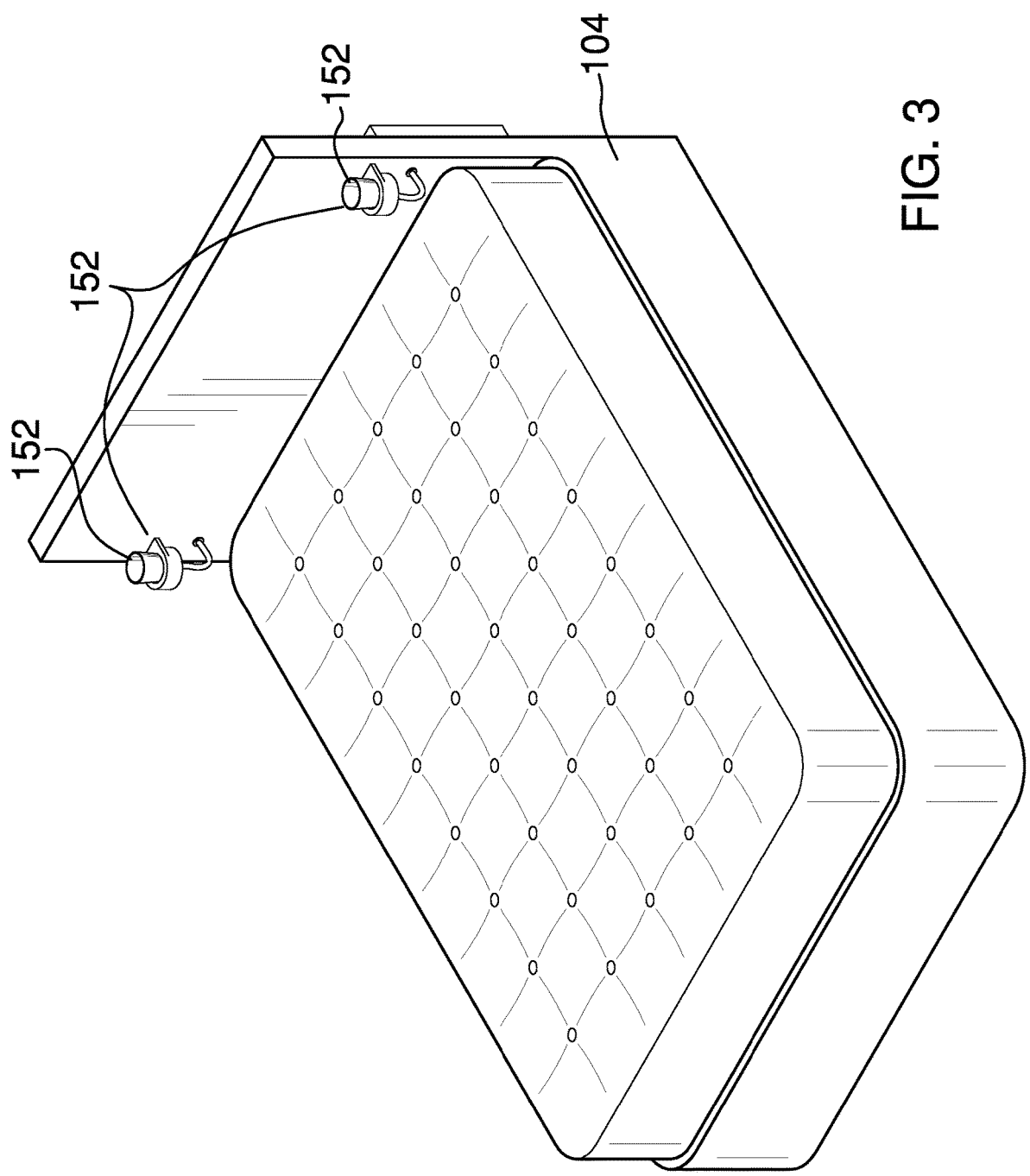
FIG. 3 is an in-use view of an embodiment of the disclosure.
Figure 4:
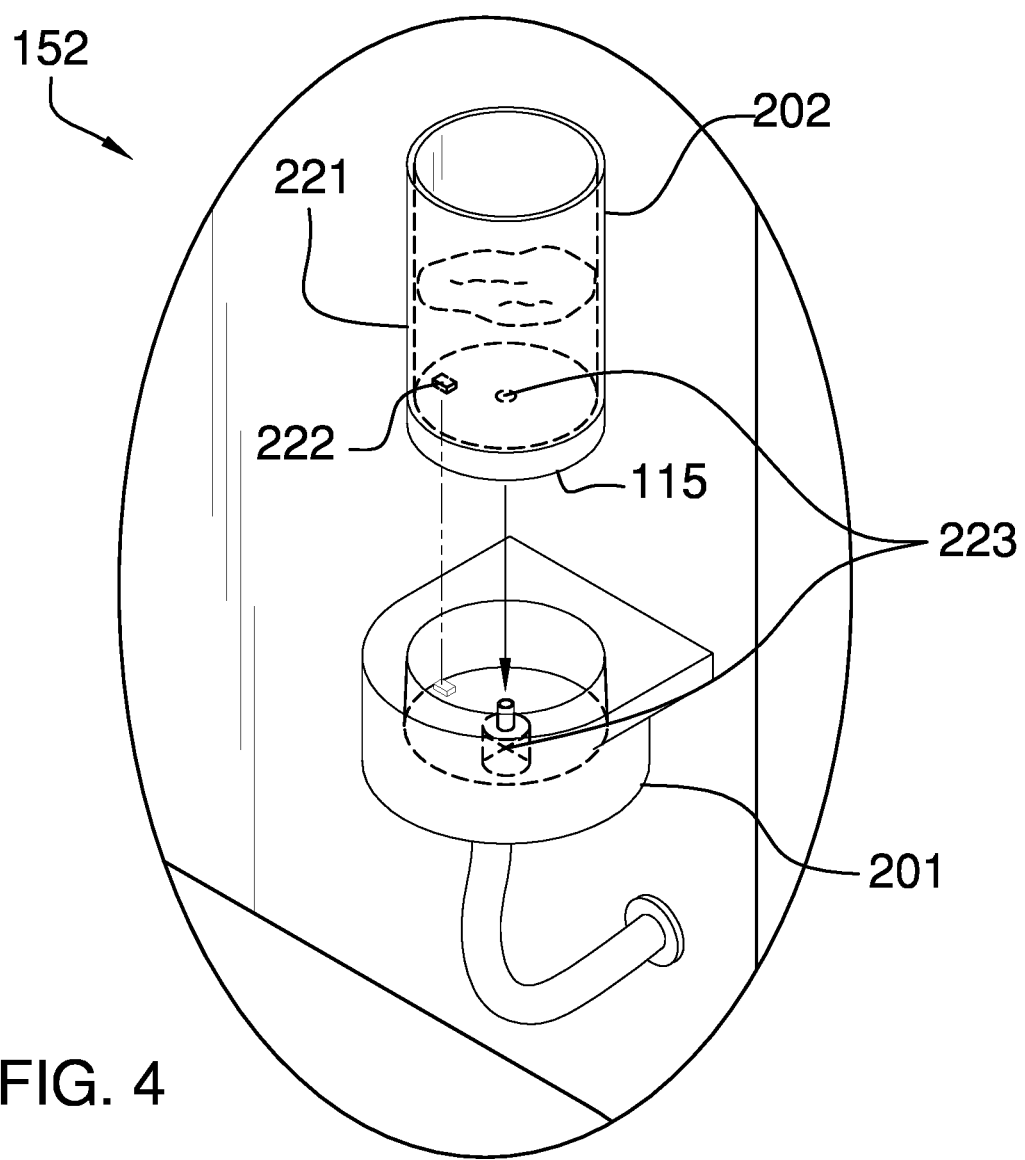
FIG. 4 is a detail view of an embodiment of the disclosure.
Figure 5:
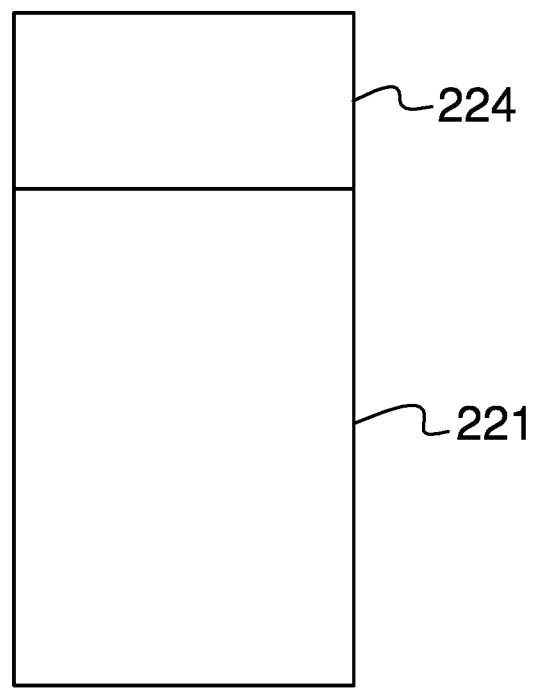
FIG. 5 is a detail view of an embodiment of the disclosure.

Detailed reference will now be made to one or more potential embodiments of the disclosure, which are illustrated in FIGS. 1 through 3.

The water-dispensing method for furniture 100 (hereinafter invention) is a process. The invention 100 comprises a water recovery process 101, a water storage treatment and a transport process 102 (hereinafter water STT process), and a discharge process 103. The water recovery process 101: a) converts water contained in a gas phase in the atmosphere into water in a liquid phase; b) initially treats the converted liquid phase water to remove microorganisms and other chemical contaminations; and c) transports the initially treated liquid phase water to the water STT process 102. The water STT process 102: a) receives and stores the initially treated (liquid phase) water from the water recovery process 101; b) subsequently treats the stored water with a final treatment to remove microorganisms and other chemical contaminations; and, c) transports the treated stored water to the discharge process 103. The discharge process 103: a) receives the water from the water STT process 102 after the final treatment; and, b) controls the discharge of the water received from the water STT process 102.

The invention 100 is incorporated as an accessory to a domestic article 104. The domestic article 104 contains the water recovery process 101, the water STT process 102, and the discharge process 103. The domestic article 104 is formed with all apertures and form factors necessary to allow the domestic article 104 to accommodate the use and operation of the invention 100. In the first potential embodiment of the disclosure, the domestic article 104 is a piece of furniture.

In the first potential embodiment of the disclosure, the applicant prefers that the following design requirements be met by the invention 100: a) the initial pH of the water recovered by the water recovery process 101 has a pH of roughly 7.0; b) the invention 100 operates at normal temperature and pressure conditions; and, c) the invention 100 operates at a noise level of less than 40 dB.

The water recovery process 101 generates the liquid phase water that is processed by the invention 100. The water recovery process 101 condenses water contained in the air from a gas phase into a liquid phase. The water recovery process 101 initially treats the condensed water to remove microorganisms and other chemical contaminations. The water recovery process 101 transports the initially treated water to the water STT process 102. The water recovery process 101 comprises a collection method 111, a first treatment method 112, and a first backflow prevention method 113.

The collection method 111 is the physical process of the water recovery process 101 that condenses gas phase water contained in the atmosphere into liquid phase water. The liquid phase water collected by the collection method 111 is transported to the first treatment method 112.

The first treatment method 112 is the initial process that treats the condensed water to remove microorganisms and other chemical contaminations from the condensed water. The condensed water is processed by the first treatment method 112 immediately after the collection method 111 is completed.

The first backflow prevention method 113 controls the flow of the water initially treated by the water recovery process 101 into the water STT process 102. Specifically, the first backflow prevention method 113 prevents water from the water STT process 102 from flowing back into the water recovery process 101.

The water STT process 102 receives the water initially treated by the water recovery process 101. The water STT process 102 stores the water initially treated by the water recovery process 101 in anticipation of future use. The water STT process 102 subsequently treats the stored water to further remove microorganisms and other chemical contaminations. The water STT process 102 transports the subsequently treated water to the discharge process 103 for final processing. The water STT process 102 comprises a storage method 121, a second treatment method 122, a second backflow prevention method 123, and a transport method 124.

The storage method 121 maintains a reserve of water initially treated by the water recovery process 101. The storage method 121 holds the water reserve in anticipation of future consumption.

The second treatment method 122 is the subsequent process that treats the water stored by the storage method 121 to remove microorganisms and other chemical contaminations. The second treatment method 122 treats the water released by the storage method 121 for transport to the discharge process 103. The second treatment method 122 immediately treats the water as the water is released from the storage method 121.

The second backflow prevention method 123 controls the flow of the water subsequently treated by the water STT process 102 into the discharge process 103. Specifically, the second backflow prevention method 123 prevents water from the discharge process 103 from flowing back into the water STT process 102.

The transport method 124 generates a pressure differential used to transport the water subsequently treated by the water STT process 102 through the storage method 121, the second treatment method 122, and the second backflow prevention method 123 processes. The transport method 124 further provides the motive forces necessary to transport the water subsequently treated by the water STT process 102 through the discharge process 103 for discharge.

The discharge process 103 receives the water subsequently treated by the water STT process 102. The discharge process 103 transports the received water subsequently treated by the water STT process 102 for final discharge. The discharge process 103 discharges the water subsequently treated by the water STT process 102 for consumption. The discharge process 103 comprises a flow control method 131 and a receiving method 132.

The flow control method 131 receives the water subsequently treated by the water STT process 102 from the water STT process 102. The flow control method 131 transports the received water to the receiving method 132 for consumption. The flow control method 131 controls the overall flow of the received water into the discharge process 103. The flow control method 131 controls the flow of the water discharged by the discharge process 103. The flow control method 131 further comprises a master flow control method 141 and one or more flow discharge control methods 142.

The master flow control method 141 is the process within the discharge process 103 that enables and disables the flow of the water subsequently treated by the water STT process 102 into the discharge process 103.

Each flow discharge control method selected from the one or more flow discharge control methods 142 is associated with an element of the receiving method 132. Each selected flow discharge control method discharges the water subsequently treated by the water STT process 102 into the receiving method 132. Each selected flow discharge control method limits the flow of the one or more flow discharge control methods 142 into the receiving method 132 such that the discharged water subsequently treated by the water STT process 102 is fully contained within the associated receiving method 132.

The receiving method 132 is the process that transports the water discharged from the discharge process 103 to its final consumption location. The receiving method 132 is selected from the group consisting of one or more discharge nozzles 151 and one or more containment vessels 152. Each receiving method 132 is accessible from the exterior of the domestic article 104 housing the invention 100.

Each of the one or more discharge nozzles 151 is a bite that inserts into a mouth. Each of the one or more discharge nozzles 151 is a nozzle that discharges the water subsequently treated by the water STT process 102 directly into the mouth for consumption. Each of the one or more discharge nozzles 151 is associated with a flow discharge control method selected from the one or more flow discharge control methods 142.

Each of the one or more containment vessels 152 is a cup that receives the water subsequently treated by the water STT process 102. Each of the one or more containment vessels 152 is a nozzle that discharges the water subsequently treated by the water STT process 102 directly into the selected containment vessel. Each of the one or more containment vessels 152 is associated with a flow discharge control method selected from the one or more flow discharge control methods 142.

Each of the one or more containment vessels 152 comprises a pedestal structure 201, a cup structure 202, and a control circuit. The cup structure 202 contains the water subsequently treated by the water STT process 102 after it is discharged from the discharge process 103. The pedestal structure 201: a) stores the cup structure 202 when not in use; and, b) provides the cup structure 202 access to the water subsequently treated by the water STT process 102 such that each of the one or more containment vessels 152 can refill itself. The control circuit: a) provides the electric energy necessary to operate each of the one or more containment vessels 152; and, b) controls the level of the water subsequently treated by the water STT process 102 contained in the cup structure 202.

The pedestal structure 201 is a mechanical structure. The pedestal structure 201 receives the cup structure 202 for storage. The pedestal structure 201 transfers the load of the cup structure 202 and the control circuit to an externally provided object such as a furniture item.

The cup structure 202 is a mechanical structure. The cup structure 202 contains the water subsequently treated by the water STT process 102. The cup structure 202 removably inserts into the pedestal structure 201 for storage. The cup structure 202 comprises a cup pan 221, a cup mortise 222, and a cup check valve 223.

The cup pan 221 contains the water subsequently treated by the water STT process 102 after it is discharged from the discharge process 103 in anticipation of consumption. The pan structure of the cup pan 221 is geometrically similar to the pedestal structure 201 such that the cup pan 221 inserts into the pedestal structure 201 for storage.

The cup check valve 223 is a check valve that installs in the cup pan 221. The cup check valve 223 forms a fluidic link between the discharge process 103 and the cup structure 202 such that the water subsequently treated by the water STT process 102 only flows in one direction. The cup check valve 223 limits the direction of the flow of the water subsequently treated by the water STT process 102 from the discharge process 103 into the cup pan 221 for storage.

The control circuit is an electric circuit. The control circuit: a) provides the electric energy necessary to operate the each of the one or more containment vessels 152; and, b) controls the level of the water subsequently treated by the water STT process 102 contained in the cup structure 202.

In a second potential embodiment of the disclosure, the cap structure 202 is modified such that: a) the cup pan 221 further comprises a lid 224; and, b) the control circuit further comprises an interlock system.

In the second potential embodiment of the disclosure, the cup pan 221 and the lid 224 are insulated structures. The lid 224 attaches to the cup pan 221 such that the lid 224 encloses the fluid containment space formed by the cup pan 221. The combination of the lid 224 and the cup pan 221 forms a thermos. The interlock system is an electromechanical structure that enables the control system's ability to control the level of water subsequently treated by the water STT process 102 contained in the cup structure 202. Specifically, the control system is only able to discharge the water subsequently treated by the water STT process 102 into the cup pan 221 when the following two conditions are met: c) the lid 224 is properly secured to the cup pan 221; while simultaneously, d) the cup check valve 224 is properly seated to form the fluidic link between the discharge process 103 and the cup structure 202.

In the first potential embodiment of the disclosure, the applicant prefers that: a) a dehumidifier be used for the collection method 111; b) an activated carbon bed filter be used for the first treatment method 112; and, c) a check valve known as a ball valve be used for the first backflow prevention method 113.

In the first potential embodiment of the disclosure, the applicant prefers that: d) a reservoir structure be used for the storage method 121; e) an activated carbon bed filter be used for the second treatment method 122; and, f) a check valve known as a ball valve be used for the second backflow prevention method 123; and, g) the transport method 124 be selected from the group consisting of: h) manually provided suction; and, i) a mechanical device such as a pump.

In the first potential embodiment of the disclosure, the applicant prefers that: j) a valve be used for the master flow control method 141; and, k) that each of the one or more flow discharge control methods 142 be a metered valve.

The following definitions were used in this disclosure:

Activated Carbon: As used in this disclosure, activated carbon is a form of carbon that is processed in a manner that presents a large surface area for chemical interactions. The surface of activated carbon is used to adsorb chemical contaminants from a fluid flow that is passed through the activated carbon.

Aperture: As used in this disclosure, an aperture is a prism-shaped negative space that is formed completely through a structure or the surface of a structure.

Ball Valve: As used in this disclosure, a ball valve is a type of commercially available check valve.

Bed Filter: As used in this disclosure, a bed filter comprises a particulate material through which a fluid is passed such that particulate material captures solids contained within the fluid while allowing the fluid itself to pass through the particulate matter.

Bite: As used in this disclosure, a bite refers to a structure that is intended to guide the insertion of an object into a person's mouth.

Check Valve: As used in this disclosure, a check valve is a valve that permits the flow of fluid in a single direction. Within selected potential embodiments of this disclosure, the check valve is a commercially available product that is selected from the group consisting of a ball valve and a Tesla valve.

Condensation: As used in this disclosure, condensation refers to the phase change of a substance from a gas phase to a liquid phase.

Corrosion: As used in this disclosure, corrosion refers to a reduction of the performance, stability or integrity of a structure that is caused by (generally undesired) chemical (including electrochemical) reactions.

Cup: As used in this disclosure, a cup is a container that is intended to contain a fluid. The cup has a shape that roughly corresponds to a pan. Glass, mug, stein, and tumbler are a synonyms for a cup.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Domestic Article: As used in this disclosure, a domestic article is an item or object: 1) that is commonly found within a household; or, 2) that is commonly carried or worn by a person. Examples of domestic articles include, but are not limited to, furniture, kitchen appliances, clothing, keys and key fobs, personal data devices, glasses, remote controls, or personal storage items such as purses, briefcases, wallets, or cases.

Drinking Water: As used in this disclosure, drinking water is water that is deemed safe for drinking or use in cooking by humans. A synonym of drinking water is potable water.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets)

Filter: As used in this disclosure, a filter is a mechanical device that is used to separate solids that are suspended in a liquid or a gas. A strainer is type of filter with what would be considered a coarse mesh measurement.

Fitting: As used in this disclosure, a fitting is a component that is attached to a first object. The fitting is used to forming a fluidic connection between the first object and a second object.

Float Switch: As used in this disclosure, a float switch is a commercially available switch that is actuated by the level of liquid contained within a contained space. A common use of a float switch is in the operation of a bilge or sump pump. Specifically, when the level of accumulated liquid in a bilge or a sump exceeds a predetermined level, the float switch will actuate into a closed position that completes an electric circuit that provides electrical power to a pump that will remove the liquid from the bilge or sump. When the accumulated liquid falls below the predetermined level the float switch will actuate into an open position discontinuing the operation of the pump.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Series Circuit: As used in this disclosure, a fluid series circuit refers to a method of connecting a plurality of fluid network elements that are connected to form a single fluid transport path from a first point to a second point in a fluid network.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Housing: As used in this disclosure, a housing is a rigid structure that encloses and protects one or more devices.

Inner Dimension: As used in this disclosure, the term inner dimension describes the span from a first inside or interior surface of a container to a second inside or interior surface of a container. The term is used in much the same way that a plumber would refer to the inner diameter of a pipe.

Insulating Structure: As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Interlock: As used in this disclosure, an interlock is a second mechanism that enables and disables the operation of a first mechanism.

Liquid: As used in this disclosure, a liquid refers to a state (phase) of matter that is fluid and that maintains, for a given pressure, a fixed volume that is independent of the volume of the container.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Normal Temperature and Pressure: As used in this disclosure, normal temperature and pressure refers to gas storage conditions corresponding to 20 degrees C. at 100 kPa (approx. 1 atmosphere). Normal temperature and pressure is often abbreviated as NTP.

Nozzle: As used in this disclosure, a nozzle is a device that receives fluid under pressure and releases the fluid in a controlled manner into an environment.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Phase: As used in this disclosure, phase refers to the state of the form of matter. The common states of matter are solid, liquid, gas, and plasma.

Port: As used in this disclosure, a port is an aperture formed in an object that allows fluid to flow through the boundary of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Reservoir: As used in this disclosure, a reservoir refers to a container or containment system that is configured to store a liquid.

Roughly: As used in this disclosure, roughly refers to a comparison between two objects. Roughly means that the difference between one or more parameters of the two compared objects are not significantly different.

Surface Filter: As used in this disclosure, a surface filter is a type of filter wherein the fluid is passed through a surface or membrane, such as a screen or paper that allows for the passage of the fluid but blocks the passage of larger particles that may be suspended in the fluid. The construction of a surface filter would allow for the passage of the fluid through several filter surfaces in one filtration unit.

Tesla Valve: As used in this disclosure, a Tesla valve is a type of check valve that requires the use of no moving parts.

Tube: As used in this disclosure, a tube is a hollow prism-shaped device formed with two open ends. The tube is used for transporting liquids and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Valve: As used in this disclosure, a valve is a device that is used to control the flow of a fluid (gas or liquid) through a pipe, tube, or hose.

Water: As used in this disclosure, water (CAS 7732-18-5) is a molecule comprising two hydrogen atoms and one oxygen molecule. The phase of water at normal temperature and pressure is liquid. As used in this disclosure, the definition of water is expanded to include dilute water-based solutions of salts and ionic structures using water as the solvent. Water in a gas phase is often referred to as steam. Water in a solid phase is often referred to as ice. Snow refers to a bulk solid form of ice.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A water-dispensing method comprising
a water recovery process, a water storage treatment and a transport process (hereinafter water STT process), and a discharge process;
wherein the water recovery process: a) converts water contained in a gas phase in the atmosphere into water in a liquid phase; b) initially treats the converted liquid phase water to remove microorganisms and other chemical contaminations; and c) transports the initially treated liquid phase water to the water STT process;
wherein the water STT process: d) receives and stores the initially treated (liquid phase) water from the water recovery process; e) subsequently treats the stored water with a final treatment to remove microorganisms and other chemical contaminations; and, f) transports the treated stored water to the discharge process;

wherein the discharge process: g) receives the water from the water STT process after the final treatment; and, h) controls the discharge of the water received from the water STT process;
wherein the discharge process comprises a flow control method and a receiving method;
wherein the receiving method is selected from the group consisting of one or more discharge nozzles and one or more containment vessels;
wherein each of the one or more containment vessels comprises a pedestal structure, a cup structure, and a control circuit;
wherein the control circuit further comprises an interlock system.

2. The water-dispensing method according to claim 1
wherein the water-dispensing method is incorporated as an accessory to a domestic article;
wherein the domestic article contains the water recovery process, the water STT process, and the discharge process.

3. The water-dispensing method according to claim 2
wherein the domestic article is a piece of furniture;
wherein the water-dispensing method requires: a) the initial pH of the water recovered by the water recovery process has a pH of 7; b) the water-dispensing method operates at normal temperature and pressure conditions;
and, c) the water-dispensing method operates at a noise level of less than 40db.

4. The water-dispensing method according to claim 3
wherein the water recovery process condenses water contained in the air from a gas phase into a liquid phase;
wherein the water recovery process initially treats the condensed water to remove microorganisms and other chemical contaminations;
wherein the water recovery process transports the initially treated water to the water STT process.

5. The water-dispensing method according to claim 4
wherein the water STT process receives the water initially treated by the water recovery process;
wherein the water STT process stores the water initially treated by the water recovery process;
wherein the water STT process subsequently treats the stored water to further remove microorganisms and other chemical contaminations;
wherein the water STT process transports the subsequently treated water to the discharge process for final processing.

6. The water-dispensing method according to claim 5
wherein the discharge process receives the water subsequently treated by the water STT process;
wherein the discharge process transports the received water subsequently treated by the water STT process for final discharge;
wherein the discharge process discharges the water subsequently treated by the water STT process.

7. The water-dispensing method according to claim 6
wherein the water recovery process comprises a collection method, a first treatment method, and a first backflow prevention method;
wherein the collection method is the physical process of the water recovery process that condenses gas phase water contained in the atmosphere into liquid phase water;
wherein the liquid phase water collected by the collection method is transported to the first treatment method;
wherein the first treatment method is the initial process that treats the condensed water to remove microorganisms and other chemical contaminations from the condensed water;
wherein the first backflow prevention method controls the flow of the water initially treated by the water recovery process into the water STT process.

8. The water-dispensing method according to claim 7
wherein the water STT process comprises a storage method, a second treatment method, a second backflow prevention method, and a transport method;
wherein the storage method maintains a reserve of water initially treated by the water recovery process;
wherein the storage method holds the water reserve in anticipation of future consumption;
wherein the second treatment method is the subsequent process that treats the water stored by the storage method to remove microorganisms and other chemical contaminations;
wherein the second treatment method treats the water released by the storage method for transport to the discharge process;
wherein the second backflow prevention method controls the flow of the water subsequently treated by the water STT process into the discharge process;
wherein the transport method further provides the motive forces necessary to transport the water subsequently treated by the water STT process through the discharge process for discharge.

9. The water-dispensing method according to claim 8
wherein the flow control method receives the water subsequently treated by the water SST process from the water SST process;
wherein the flow control method transports the received water to the receiving method;
wherein the receiving method is the process that transports the water discharged from the discharge process to its final location.

10. The water-dispensing method according to claim 9 wherein the condensed water is processed by the first treatment method immediately after the collection method is completed.

11. The water-dispensing method according to claim 10 wherein the first backflow prevention method prevents water from the water STT process from flowing back into the water recovery process.

12. The water-dispensing method according to claim 11
wherein the second treatment method immediately treats the water as the water is released from the storage method;
wherein, the second backflow prevention method prevents water from the discharge process from flowing back into the water STT process;
wherein the transport method generates a pressure differential used to transport the water subsequently treated by the water STT process through the storage method, the second treatment method, and the second backflow prevention method processes.

13. The water-dispensing method according to claim 12
wherein the flow control method controls the overall flow of the received water into the discharge process;
wherein the flow control method controls the flow of the water discharged by the discharge process.

14. The water-dispensing method according to claim 13
wherein the flow control method further comprises a master flow control method and one or more flow discharge control methods;

wherein the master flow control method is the process within the discharge process that enables and disables the flow of the water subsequently treated by the water STT process into the discharge process;

wherein each flow discharge control method selected from the one or more flow discharge control methods is associated with an element of the receiving method;

wherein each selected flow discharge control method discharges the water subsequently treated by the water STT process into the receiving method;

wherein each selected flow discharge control method limits the flow of the one or more flow discharge control methods into the receiving method such that the discharged water subsequently treated by the water STT process is fully contained within the associated receiving method.

15. The water-dispensing method according to claim 14 wherein each receiving method is accessible from the exterior of the domestic article housing the water-dispensing method.

16. The water-dispensing method according to claim 15
wherein each of the one or more discharge nozzles is a bite that inserts into a mouth;
wherein each of the one or more discharge nozzles is a nozzle that discharges the water subsequently treated by the water STT process directly into the mouth for consumption;
wherein each of the one or more discharge nozzles is associated with a flow discharge control method selected from the one or more flow discharge control methods;
wherein each of the one or more containment vessels is a cup that receives the water subsequently treated by the water STT process;
wherein each of the one or more containment vessels is a nozzle that discharges the water subsequently treated by the water STT process directly into the selected containment vessel;
wherein each of the one or more containment vessels is associated with a flow discharge control method selected from the one or more flow discharge control methods.

17. The water-dispensing method according to claim 16
wherein the cup structure contains the water subsequently treated by the water STT process after it is discharged from the discharge process;
wherein the pedestal structure: a) stores the cup structure when not in use; and, b) provides the cup structure access to the water subsequently treated by the water STT process such that each of the one or more containment vessels can refill itself;
wherein the pedestal structure is a mechanical structure;
wherein the pedestal structure receives the cup structure for storage;
wherein the pedestal structure transfers the load of the cup structure and the control circuit to an externally provided object;
wherein the cup structure contains the water subsequently treated by the water STT process;
wherein the cup structure removably inserts into the pedestal structure for storage;
wherein the cup structure comprises a cup pan, a cup mortise, and a cup check valve;
wherein the cup pan contains the water subsequently treated by the water STT process after it is discharged from the discharge process in anticipation of consumption;
wherein the pan structure of the cup pan is geometrically similar to the pedestal structure such that the cup pan inserts into the pedestal structure for storage;
wherein the cup check valve is a check valve that installs in the cup pan;
wherein the cup check valve forms a fluidic link between the discharge process and the cup structure such that the water subsequently treated by the water STT process only flows in one direction;
wherein the cup check valve limits the direction of the flow of the water subsequently treated by the water STT process from the discharge process into the cup pan for storage;
wherein the control circuit is an electric circuit;
wherein the control circuit: a) provides the electric energy necessary to operate the each of the one or more containment vessels; and, b) controls the level of the water subsequently treated by the water STT process contained in the cup structure.

18. The water-dispensing method according to claim 17
wherein the cup pan further comprises a lid;
wherein the cup pan and the lid are insulated structures;
wherein the lid attaches to the cup pan such that the lid encloses the fluid containment space formed by the cup pan;
wherein the combination of the lid and the cup pan forms a thermos;
wherein the interlock system is an electromechanical structure that enables the control system's ability to control the level of water subsequently treated by the water STT process contained in the cup structure;
wherein the control system is only able to discharge the water subsequently treated by the water STT process into the cup pan when the following two conditions are met: c) the lid is properly secured to the cup pan; while simultaneously, d) the cup check valve is properly seated to form the fluidic link between the discharge process and the cup structure.

19. The water-dispensing method according to claim 18
wherein a) a dehumidifier is used for the collection method; b) an activated carbon bed filter is used for the first treatment method; and, c) a check valve known as a ball valve is used for the first backflow prevention method;
wherein d) a reservoir structure is used for the storage method; e) an activated carbon bed filter is used for the second treatment method; and, f) a check valve known as a ball valve is used for the second backflow prevention method; and, g) the transport method be selected from the group consisting of: h) manually provided suction; and, i) a pump;
wherein j) a valve is used for the master flow control method; and, k) that each of the one or more flow discharge control methods be a metered valve.

* * * * *